United States Patent [19]

Sager et al.

[11] Patent Number: 4,825,412
[45] Date of Patent: Apr. 25, 1989

[54] LOCKOUT REGISTERS

[75] Inventors: David J. Sager, Acton; Raj K. Ramanujan, Leominster; Jeffrey L. Bell, Maynard, all of Mass.

[73] Assignee: Digital Equipment Corporation, Maynard, Mass.

[21] Appl. No.: 176,448

[22] Filed: Apr. 1, 1988

[51] Int. Cl.[4] ............................................. G11C 15/00
[52] U.S. Cl. ....................................... 365/49; 365/189; 364/200
[58] Field of Search .......................... 365/49, 189, 230; 364/200

[56] References Cited

U.S. PATENT DOCUMENTS 4,559,618 12/1985 Houseman et al. ................. 365/49

Primary Examiner—Terrell W. Fears
Attorney, Agent, or Firm—Kenyon & Kenyon

[57] ABSTRACT

A cache memory system in a data processor that has a main memory and a processing unit, the cache memory system including a virtually addressed storage cache. This virtually addressed storage cache is connected to the main memory for storing in storage cache locations preselected portions of data from the main memory. Each cache location includes a valid indicator to indicate the data in the cache location is current. A translation buffers is coupled to the storage cache, and translates a virtual address to a physical address. The backmap is coupled to the storage cache and the translation buffer, and invalidates data in the storage cache by generating an invalidate index to the cache location at which a valid indicator is to be cleared only when data in the storage cache is to be invalidated. The cache memory system includes at least one lockout register for storing addresses for data which may exist in more than one storage location. The backmap invalidates all copies of the data in the storage cache after every reference to data in the storage cache using an address in the lockout register.

4 Claims, 3 Drawing Sheets

LOCKOUT REGISTERS

FIELD OF THE INVENTION

The present invention relates to the field of digital computers and their architecture. More particularly, it relates to cache memories used in computers.

BACKGROUND OF THE INVENTION

In a system with a storage hierarchy, selected blocks of data from main storage are stored in a local buffer or cache memory for fast access by the processing units or processors. When the processor requests new data, the system first checks the cache memory to determine whether it is available. If the data is available in the cache memory, the data is provided to the processor. In the event the data is not available in the cache memory, the data is retrieved from the main memory, which is on a lower level in the storage hierarchy.

To supply some modern processors with instructions and data for this operation, cache memories are sometimes used which are capable of extremely rapid information retrieval and transmission. Such cache memories are available, usually in the form of Random Access Memories (RAM). Such fast memories, however, are generally on the order of a few thousand bytes. Since only a very few blocks of data can be stored in memories of that size, the main memory is of a larger byte size, but with slower access and retrieval time. The lower level main memory includes larger RAMs with slower retrieval speeds, bubble memories, disc memories of various types and other memories.

Two principles insure that use of a cache memory will be successful. The first principle is spatial locality. When a given program is run, the instructions the program uses and the related data tend to be stored in close proximity with one another. Thus, a relatively small block of instructions and data can perform a large portion of the program. The second principle is temporal locality which states that once a given instruction or set of instructions is accessed, it is likely that it will be accessed again in the near future. Again, this tends to make the accessibility of a small group of instructions and data extremely useful.

A commonly used method to optimize computer operations is to couple a cache memory directly to the central processing unit (CPU) and to couple other larger memories to both the cache memory and the CPU as lower level memories. In this manner, the cache memory can supply the CPU with the data needed at a rate which will allow fast CPU operation. Lower level memories fill data into the cache memory, thereby keeping it full. If a required block of data is not in the cache memory when the CPU requires it, the data block can be obtained from lower level memory. In other words, if a miss to cache memory occurs, the data is obtained from the lower level memory.

A cache memory can be accessed in at least two ways. The first, physical addressing, is when data in the cache memory is accessed using a physical address which specifies the actual location of the data. The second way is virtual addressing in which the data in the cache memory is referenced through a virtual address. In order to retrieve data from a physically addressed cache memory, the virtual addresses must be translated to the physical addresses using a structure called a virtual to physical translation buffer. Both physically and virtually addressed cache memories are in current use in computer design.

The use of virtual addresses for data access from a cache imposes requirements that are not found in physically addressed cache memories. For example, a physical address to virtual cache index translation mechanism (backmap) must be provided. The backmap is used by the physically addressed portion of the system to locate data which is stored in the virtually addressed cache.

Caches work most efficiently when they are as full with data as possible. This is because fewer attempts to find the data in the cache memory will result in misses which require retrieval from the lower level memories. Therefore, it is desirable to minimize flushing of the cache memory to the smallest number of data blocks possible. Refilling of the cache with new data should be done quickly and efficiently.

When data in the cache memory is modified by other devices such as other processors, the data within the cache memory must be invalidated since it is no longer current. Accordingly, a data block in the virtually addressed cache is typically invalidated when it contains the data that is being modified by the devices in the system. Subsequently, when data is filled into the cache memory, a corresponding entry must be provided in the backmap.

Another problem with the use of virtual addressing is the presence of synonyms in the cache memory. Synonyms are data entries with the same physical address but with different virtual addresses. The presence of synonyms disrupts efficient retrieval of data from cache memory. The process of detecting synonyms may be time-consuming and require complicated logic.

SUMMARY OF THE INVENTION

It is an object of the present invention to provide a system using virtual caches which is as fast as possible, while supporting the caches as efficiently as possible. The above identified objects of the present invention are achieved by providing a cache memory system including a virtual cache memory, a physical cache memory, a virtual to physical translation buffer (translation buffer), a physical address to virtual cache index translation mechanism (backmap), an Old-PA pointer and lock-out registers. Each entry in the virtual cache memory contains an index derived from the virtual address for the data, and a valid bit. Each valid block in the virtual cache memory has a corresponding entry in the backmap. The backmap has, however, many more entries than does the virtual cache memory. The backmap entries contain valid bits and virtual cache indexes, but not physical tags. The Old-PA pointer contains an entry for each data block in the virtual cache memory describing the corresponding backmap entry. The Old-PA pointer is used to keep track of the valid bits set in the backmap. The lock-out registers temporarily store a representation of all possible virtual addresses that could be synonyms every time a write miss occurs to the virtual cache memory.

When the computer system issues invalidates to physically addressed data, a copy of which may be in the virtual cache memory, the backmap is indexed using the physical address. If the valid bit at a particular entry in the backmap is set, the corresponding block in the virtual cache memory has its valid bit cleared. The valid bits in the Old-PA pointer and the backmap are not flushed.

After a read miss to the virtual cache memory, the virtual cache memory address indexes the Old-PA pointer which provides a physical address index. The Old-PA pointer indicates the backmap entry of the virtual cache index for the virtual cache block being overwritten by the refill. The backmap valid bit is then cleared, and the physical address for the data written to the virtual cache memory is written from the translation buffer into the Old-PA pointer, and a new backmap entry is created describing the new block being filled into the virtual cache memory.

In addition, after every write miss to the virtual cache memory, the untranslated bits in the virtual address are saved in the lockout register. All read and write requests are then compared against the lockout registers. If no possible synonym exists, the read or write is allowed to continue. If, however, the request matches an entry in the lockout register, the read or write is treated as a miss and sent down to physical cache memory. The backmap then checks and invalidates any synonyms in the virtual cache memory.

DETAILED DESCRIPTION

Figure 1:
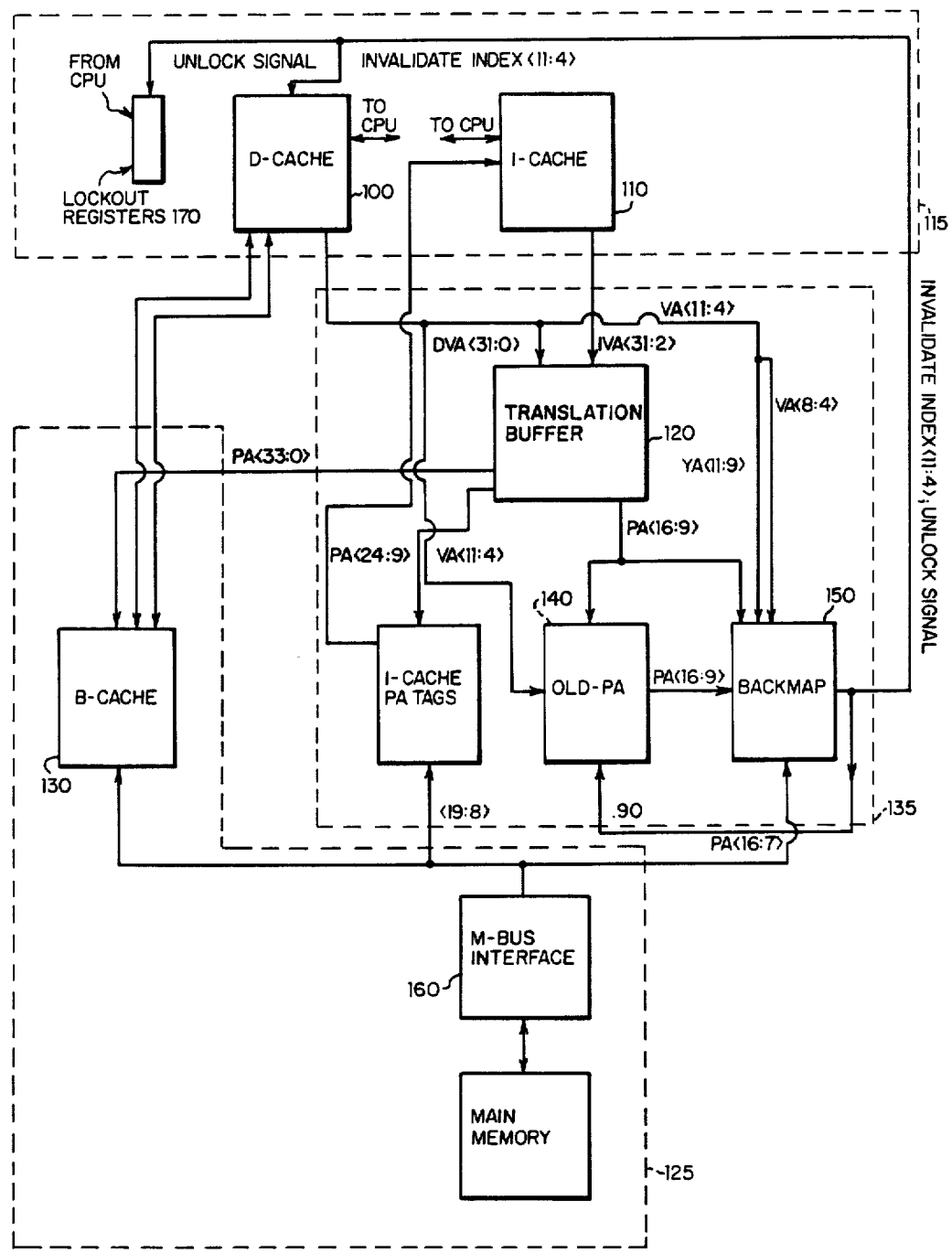
FIG. 1 is a block diagram of a cache memory system in accordance with the present invention.

The operating environment of the present invention is shown in FIG. 1, where a cache memory system is depicted. The system will be discussed in terms of its functional components. These components, however, may be located on a plurality of modules and circuit boards. In addition, the cache memory system of the present invention is useful in a computer with one or more processors.

The cache system includes D-Cache 100, I-Cache 110, translation buffer 120, B-Cache 130, Old-PA pointer 140, backmap 150, M-bus Interface 160, lockout registers 170, M-bus 180, I-Stream 190, D-stream 200 and Main Memory 210 and an I-Cache PA tag store 220.

Figure 2:
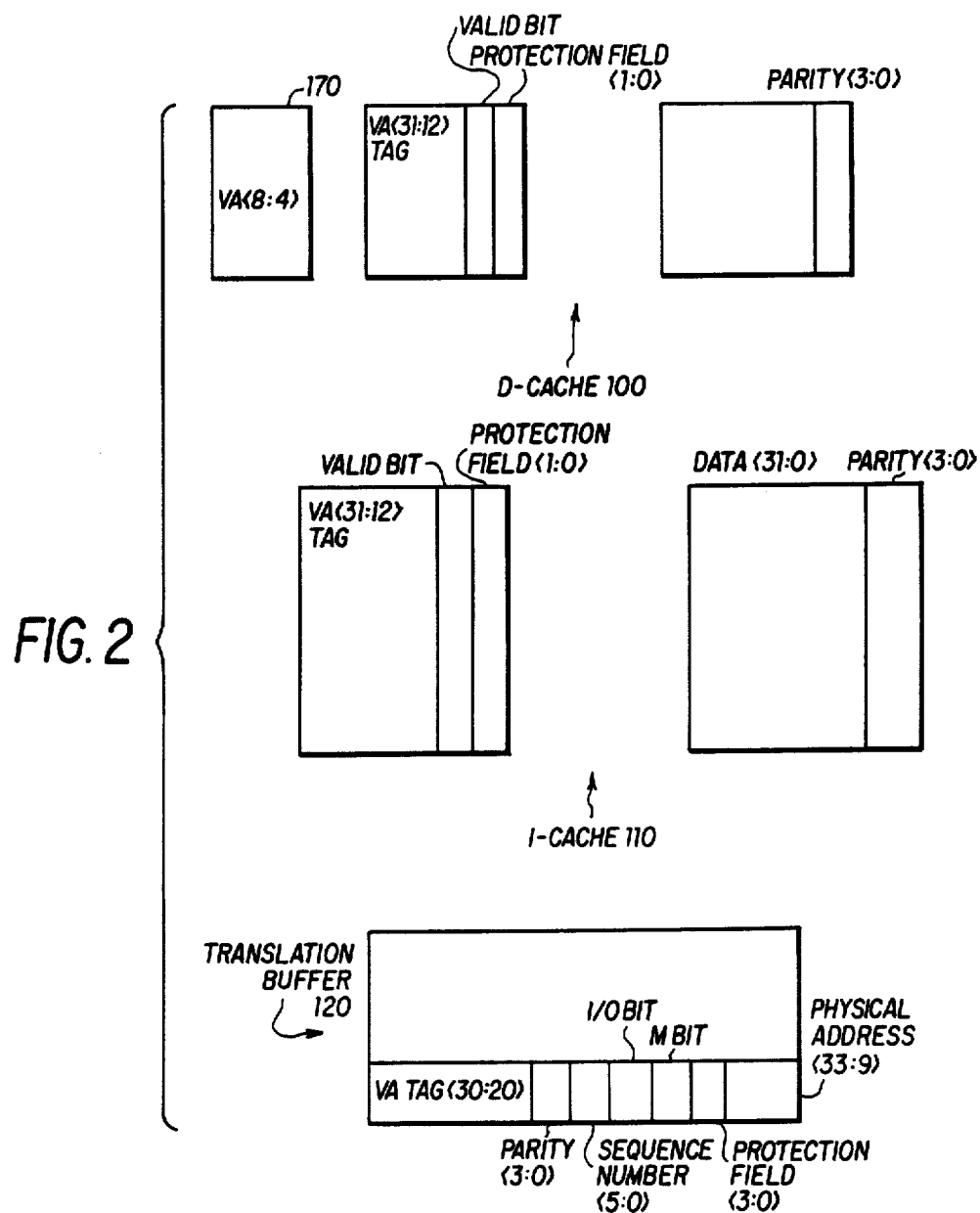
FIGS. 2 and 3 illustrates the bit fields for the components shown in FIG. 1.

D-Cache 100 is a direct mapped, virtually addressed cache memory used for reading and writing D-stream 200 data from the CPU. For example, the D-Cache 100 may comprise a 4 Kbyte RAM with an access time on the order of one 14 nanosecond cycle and with a data block size of 16 bytes. Each entry in D-Cache 100 has a valid bit and a virtual address tag as seen in FIG. 2.

The valid bit is used to determine if the information contained in the data block is valid. For example, when D-Cache 100 is flushed, all valid bits in each of the data blocks are cleared, indicating invalid data and allowing the present contents of the block to be overwritten. As new valid data is written to each block the valid bit is set, indicating that the data contained therein is valid. In contemplated embodiments, the valid bits may be physically separated from the data blocks and stored in a different physical location.

The virtual address bits, VA $<11:0>$, are broken up into the following fields:

$<3:0>$—within the block bits
$<8:4>$—untranslated latch bits
$<11:9>$—true virtual bits
$<11:4>$—cache tag index The "within the block bits" $<3:0>$ index a specific location within a block of sixteen locations in which the data is to be found. The untranslated latch bits and the true virtual bits will be described later. The cache tag index bits, $<11:4>$, index blocks within the cache, while bits $<11:0>$ are the cache data location.

I-Cache 110 is also a direct mapped, virtually addressed cache memory with physical and virtual address tags seen in FIG. 2. I-Cache 110 is used to fetch I stream 190 data from the CPU. I-Cache 110 may comprise a 4 Kbyte RAM with a fourteen nanosecond cycle.

The virtual caches are shown with a dashed box 115, which is connected to a CPU, not shown. Everything going on within this box uses virtual addressing. Below the virtual box 115 is a dashed box 125 which represents the parts of the system which use physical addressing. In between boxes 115 and 125 is support box 135, which provides translations between virtual and physical memory addresses, as well as keeping track of which data in the virtual box 115 is valid.

Both I-Cache 110 and D-Cache 100 are coupled to translation buffer 120. Translation buffer 120 is direct mapped and may comprise 4096 entries within a plurality of 4Kbyte RAMs as seen in FIG. 2. Each entry includes 25 physical address bits, a valid bit and a virtual address tag. The translation buffer 120 is used to translate virtual addresses to physical addresses for all D-Cache 100 misses. B-Cache 130 is coupled to translation buffer 120. The B-Cache 130 is a direct mapped and physically addressed cache memory. B-Cache 130 may comprise 1 Mbyte of RAM with an access time of four cycles. Both I-Cache 110 and D-Cache 100 are proper subsets of B-Cache 130. In other words, if data is not located within B-Cache 130, it cannot be located within I-Cache 110 or D-Cache 100. The B-Cache 130 supplies data to I-Cache 110 and D-Cache 100 when there is a miss accessing these cache memories.

Figure 3:
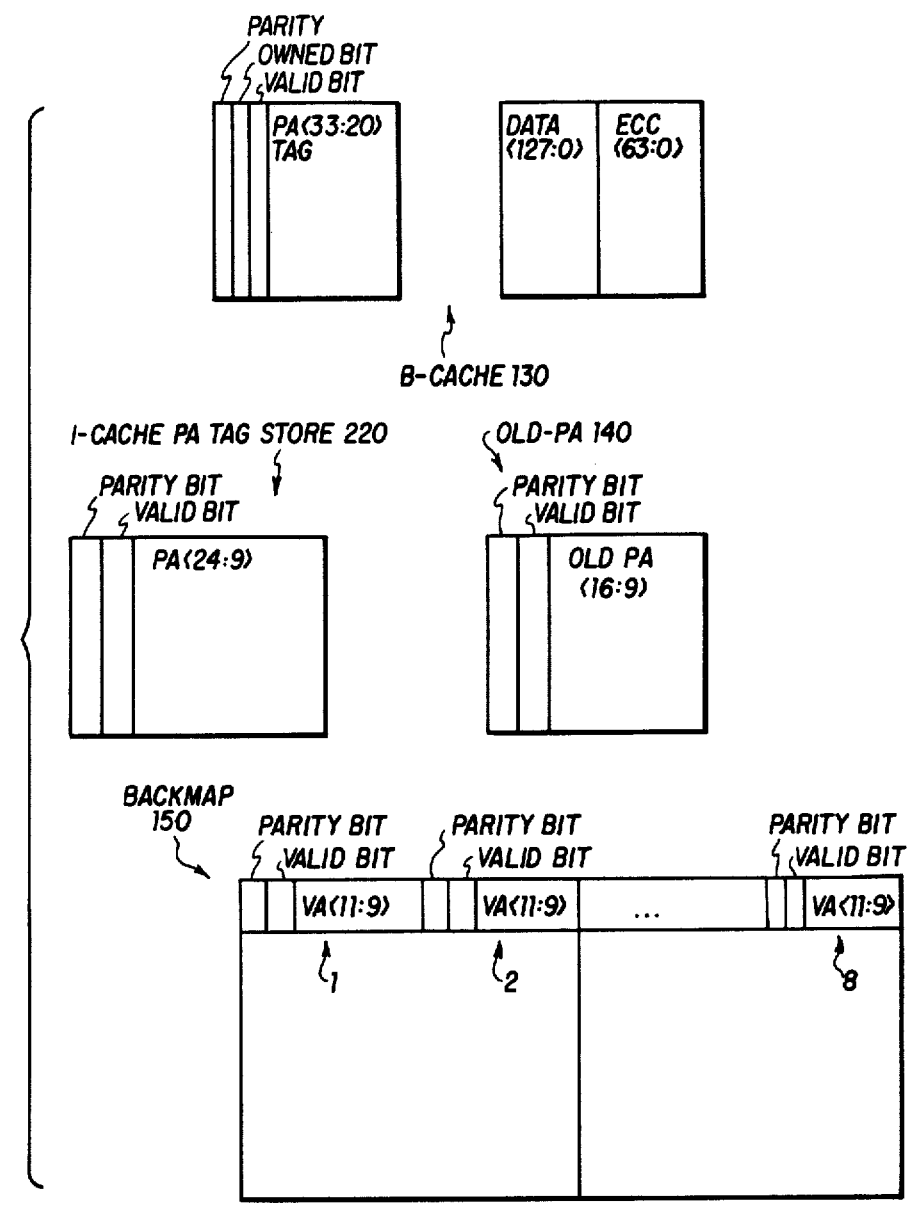

Backmap 150 is a physical address to virtual cache index translation mechanism coupled to translation buffer 120. Each physical address simply indexes onto backmap 150. Backmap 150 may comprise sixteen 1 Kbyte RAMs organized into eight columns. Each backmap 150 entry contains valid bits and virtual address bits specifying where that physical address is in D-Cache 100. (FIG. 3). Every valid block of data in D-Cache 100 must have a corresponding backmap 150 entry. The backmap 150 is used to prevent synonyms in D-Cache 100 and to remove data blocks from D-Cache 100 because of invalidates from the main memory 210. An invalidate occurs when the data block within D-Cache 100 becomes obsolete due to data written from other sources such as other processors or Direct Memory Access (DMA) traffic.

The backmap 150 contains many more entries than blocks in D-Cache 100. The illustrated embodiment of the backmap 150 has a 32 entry to 1 block ratio. Due to this large ratio, backmap 150 does not need to contain any physical address tags or logic which matches physical addresses. The absence of physical address tag storage and matching logic allows for smaller implementation of invalidates since only the backmap 150 valid bits are considered.

In the described embodiment, the size of D-Cache 100 is 4 Kbytes, compared with the computer system page size of 512 bytes. Thus, only three virtual address bits $<11:9>$, along with a valid bit, are stored in a backmap 150 entry used to index D-Cache 100. Consequently, there are exactly eight possible locations in D-Cache 100 where any given physical address could be represented. These eight locations are possible synonym locations for that physical address in D-Cache 100. Hence, when all blocks in D-Cache 100 corresponding to a particular backmap 150 entry are invalidated, more blocks may be invalidated than necessary. In this embodiment, simulation has shown that there is only one extra invalidate per 100 references, so additional time spent over-invalidating is minimal. Note that extra invalidates during D-Cache miss processing are always to invalid data blocks since the backmap 150 is not flushed on a context switch, i.e. when a new program is run, as is D-Cache 100.

Old-PA pointer 140 is virtually indexed by bits VA <11:4> and contains an entry for each block in D-Cache 100 describing the corresponding entry in backmap 150. (FIG. 3). The Old-PA pointer 140, made up of RAMs, is used as a pointer store that keeps track of the entries in which valid bits are set in the backmap 150 for the data currently stored in D-Cache 100. In most cases this means that Old-PA pointer 140 contains bits <16:9> of the physical address for the data that is currently stored in D-Cache 100 and a valid bit. This is not true after a context switch because the D-Cache 100 is invalidated and the Old-PA pointer 140 and the backmap 150 are not.

The Old-PA pointer 140 removes the need to do two virtual to physical maps, once to remove the old address and once to add the new address, when data is filled into D-Cache 100. First, the old entry is flushed using the backmap index <16:9> saved in the Old-PA. Next, the new entry corresponding to the data written to D-Cache 100 is loaded into the backmap 150 and into the Old-PA pointer 140.

Lockout registers 170 are coupled to D-Cache 100. They include a data store and a comparator to compare the untranslated address bits of previous write misses with the untranslated address bits of references the to D-Cache 100. All references matching the lockout registers 170 will be forced to miss in D-Cache 100, and sent down to B-Cache 130. All other references will continue to read or write to D-Cache 100.

M-bus interface 160 couples B-Cache 130 to M-bus 180. M-bus interface 160 implements the M-bus protocol and has the I/O and interprocessor, interrupt logic. The M-bus 180 connects the cache memory system to main memory 210. Main memory 210 is the lowest memory in the storage hierarchy.

In a computer, the virtual addressing can be set up to map many pages of virtual address space onto the same page frame of physical memory at various times. At the extreme it would be possible to map all virtual address space onto a single page of physical memory. This extreme will be used for the following example. Only the address bits within a page (the untranslated bits) would actually matter as far as reading or writing the same data is concerned. For example, virtual address 803 and virtual address E03 would read the physical address 003. Writing the data "4DEB" to virtual address 803 and then reading virtual address E03 should return the data 4DEB.

For a physical cache, the translation buffer 120 would translate the virtual address into a physical address. Since we have chosen in the example to map all of the virtual address space onto the first page of physical memory, this amounts to changing the page address into zero. Thus, when the data 4DEB is written to virtual address 803, the translation buffer 120 will produce a physical address 003 which is used to write the data into the physical cache. When the read to address E03 takes place, the translation buffer 120 will produce a physical address 003 which is used to read the data 4DEB from the place it was written. The program gets the value changed by the previous write.

The D-Cache in the system described uses virtual address bits 0 through 11 to locate data in the D-Cache. This means that bits 9, 10 and 11 are subject to memory management translations. In the example above, the data would have been written to address 803 in the D-Cache. The read to address E03 should have returned the data just written, but since this is a different location in the D-Cache the wrong data would be returned. Addresses E03 and address 803 are different virtual address "names" for the same physical address, i.e., synonyms.

One of the jobs of the backmap 150 is to detect and destroy synonyms as they come into existence. This enforces the policy of keeping only one copy of a piece of data in the D-Cache 100 at a time.

To prevent the creation of synonyms, the backmap 150 stores physical to virtual mappings. Whenever new data is added to the D-Cache 100, the backmap 150 checks to see if there is a copy of the data already in the D-Cache 100 under a different virtual address. In the example above, the data was at virtual addresses E03 and 803. This situation would not be allowed in the D-Cache of the system described.

Referring to FIG. 1, we assume the code being run looks like this:

MOVL 803,R0; Read virtual address 803,
MOVL R1,803; Write to virtual address 803,
MOVL E03,R2; Read virtual address E03, will remove 803 from D-Cache 100
MOVL R0,803; Write miss will remove E03

Starting with D-Cache 100 empty, the read to virtual address 803 will miss. Translation buffer 120 will perform the translation. B-Cache 130 reads the data from physical address 003 and returns the data to D-Cache 100 which will place it at virtual address 803. During the refill, backmap 150 will check to see if there is another virtual address which maps 003 that is currently in D-Cache 100. D-Cache 100 is empty so nothing needs to be done.

Next, the program writes to virtual address 803. The D-Cache 100 copy of the data is updated as well as the B-Cache 130 copy. Backmap 150 checks to see if there is now a stale copy of the data in D-Cache 100, but there is not so nothing is done. The program will then read virtual address E03 which will miss in D-Cache 100. Translation buffer 120 translates the virtual address E03 and asks B-Cache 130 for the block at physical address 003. This block (4DEB) will be placed into D-Cache 100 at virtual address E03. During the refill, backmap 150 will check to see if there is another virtual address mapping 003 that is currently in D-Cache 100. In this case, backmap 150 would find that virtual address 803 was mapping the same physical address and was in the D-Cache 100. The D-Cache 100 is then instructed to invalidate the block containing virtual address 803. So after the refill is finished there is one copy of the data 4DEB in D-Cache 100 and it is at virtual address E03. Finally, the program writes the same data back to virtual address 803. This will miss in D-Cache 100. On the miss, backmap 150 will check to see if there is a stale copy of the data in the D-Cache 100, and there is. Therefore, backmap 150 will tell D-Cache 100 to invalidate the data at virtual address E03. D-Cache 100 is once again empty.

In summary, D-Cache 100 contains only three bits being translated. This means that copies of a single piece of data could be in up to eight places in D-Cache 100. For the example above, the data 4DEB could be read by using addresses 003, 203, 403, 603, 803, A03, C03 or E03. Since there can be only one of these in D-Cache 100 at a time, the backmap 150 only needs to store data for one physical to virtual mappings. Instead, only three bits of virtual address need to be stored in the backmap 150 for each physical address that is mapped in D-Cache 100.

In addition to synonyms, data can become stale because, for example, some other processor has written the data. When this occurs, invalidates are sent by main memory 210 to both the B-Cache 130 and the backmap 150 using M-bus 180. The backmap 150 will be indexed by the physical address of the invalidate and destroy any data it has in any D-Cache 100 and generate invalidate indexes corresponding to that physical address. Data only gets into D-Cache 100 after first being loaded into B-Cache 130. The backmap 150 only uses part of the physical address when it checks to see if an invalidate virtual address should be sent to the D-Cache 100. Bits <16:7> are used. If an invalidate to physical address A00000 arrived from the M-bus 180, backmap 150 would invalidate all eight blocks of data which could be synonyms in D-Cache 100 even though it didn't have to. Bits <16:7> of the physical address are used to index the backmap 150 when an invalidate comes from the M-Bus interface 160. This provides the backmap 150 with eight sets of data. All eight locations have to be invalidated since the data could be in any of the eight blocks.

If the current transaction was caused by a D-Cache 100 read or write miss, there is only one location in backmap 150 that is checked, since the Old-PA provides bits <16:9> and untranslated position bits <6:4> are available to get the specific backmap location. If the valid bit is set, then the three bits of virtual address read from the backmap 150 entry are concatenated with untranslated bits <8:6> and concatenated with the position bits <6:4> to produce the invalidate index for the D-Cache 100 block to invalidate.

After a new data block is filled into D-Cache 100, it is important to remove one valid bit from backmap 150. When a read miss occurs, the D-Cache 100 index, VA<11:4>, is used to index the Old-PA pointer 140. The entry in the Old-PA pointer 140 indexed by VA<11:4> will be the physical address index (backmap index) in the backmap 150 which contains the valid bit that was set the last time that D-Cache 100 block was used. This bit will be cleared since the data is no longer in D-Cache 100, and might have been removed some time before. Since a valid bit will be set in backmap 150 for the new block being added to the D-Cache 100, it is necessary to update the Old-PA pointer 140 to keep track of the new valid bit. To do this, the D-Cache 100 index bits, VA<11:4>, are used to index the Old-PA pointer 140. PA<16:9> is written into Old-PA pointer 140 at the entry indexed by VA<11:4>. This will update Old-PA pointer 140 to point to the valid bit just set in the backmap.

The backmap 150 does not store tags for the physical address. Only bits PA<16:7> of the physical address are used. This means that in some cases, backmap 150 will invalidate data in D-Cache 100 that is current.

READ MISS

A D-Cache 100 miss would create a synonym in D-Cache 100 if the data being refilled is already in D-Cache 100 under a different virtual address. The backmap 150 must check to see if this is the case and invalidate the synonym in the D-Cache 100. In accordance with a significant feature of the invention, the backmap 150 is also used to prevent synonyms from appearing in the D-Cache at the same time, in addition to its function of translating a physical address to a virtual cache index. In addition to this, if the block in D-Cache 100 that will be refilled was a valid block, then there is information in backmap 150 about this block that needs to be removed. This is done by using the backmap index provided by the Old-PA pointer 140 to clear the valid bit in backmap 150. All this is done while the B-Cache 130 is looking for the data and will be completed before the refill from B-Cache 130 has fully arrived. The sequence of events that takes place on a D-Cache 100 read miss follows:

Use VA<11:4> of the virtual address for which there is a D-Cache miss to index the OLD-PA location which contains the OLD-PA pointer. This will be used to point to the location in the backmap 150 which is to be invalidated.

Load NEW-PA<16:9> which is obtained from the translation buffer 120 into the OLD-PA location indexed by VA<11:4> in the previous step.

Write VA<11:9> into the new backmap location determined from NEW-PA<16:9>. The specific new backmap location is determined by using position bits <6:4>.

If the entry pointed to by the OLD-PA has its valid bit set, form the invalidate index by concatenating the VA bits <11:9> read from backmap 150 with untranslated bits <8:4>. If this address is the same D-Cache 100 block that is being refilled, then nothing is done. If it is a different D-Cache 100 block, then the invalidate index and UNLOCK signal is asserted and the invalidate index is sent to D-Cache 100 and the Old-PA 140.

WRITE MISS

A D-Cache 100 write miss might be writing data to a location that is already in D-Cache 100 under a different virtual address tag. The data stored at the other virtual address is now stale and must be removed from D-Cache. During the time between the write miss and the completion of the backmap 150 checking for synonyms, all reads to cache blocks that might contain synonyms must be stopped by D-Cache 100. This is accomplished by the lockout registers 170 described later. If a read to one of these blocks occurs before the backmap 150 can check for synonyms, D-Cache 100 will force the read to be a miss. The sequence of events that takes place to accomplish this follows:

Same procedure as for read miss with the additional step below:

Asserting an UNLOCK signal when the entry selected is not valid (synonym checking). The address of the synonym block to unlock is sent on the invalidate index wires. The D-Cache 100 will now be able to allow read hits on the block that might have contained a synonym.

INVALIDATES

An invalidate from the system can cause up to eight invalidates in the D-Cache 100. This is because there are up to eight D-Cache 100 blocks in a single B-Cache 130 block. Unlike the read and write miss cases, an invalidate can take more than one B-Cache 130 cycle to complete. This is necessary when more than one of the eight valid bits is set. When this happens, the backmap 150 will assert the invalidate signal and begin to produce one invalidate index every cycle until all the blocks that had valid bits set are invalidated.

The sequence of events needed to complete an invalidate follows:

Use the PA<16:7> backmap index from M-Bus interface 160 to read backmap 150 and to clear all eight valid bits.

If a valid bit is set, create the invalidate virtual index by using the VA<11:9> read from the backmap 150, PA<8:7>, and the encoding of the valid bit number to get bits VA<6:4>. This must be done for each valid bit that is set.

It is also contemplated to clear the D-Cache 100, the backmap entry and the Old-PA entry at the same time, when an invalidate comes from the M-Bus interface 160. For this purpose, a back pointer 190 is used which connects the backmap 150 to the Old-PA 140 and points to the Old-PA location to be invalidated.

D-CACHE FLUSHES

When the data in the D-Cache 100 needs to be flushed for example, before a new program is run, only the D-Cache 100 valid bits are cleared. The entries in Old-PA pointer 140 and backmap 150 are untouched. This process eliminates the need to map the virtual addresses in D-Cache 100 onto backmap 150 in order to flush the backmap 150 entries.

The flushing process makes use of the Old-PA pointer 140 valid bits for each entry. These valid bits are a flag that specifies when a valid backmap 150 entry exists for that data. Therefore, if the valid bit in Old-PA pointer 140 is set, the corresponding backmap entry has not yet been removed. Thus, Old-PA pointer 140 valid bits indicate which backmap entries are valid.

LOCKOUT REGISTERS

All read and write requests to the D-Cache 100 are compared against the entries in the lockout registers 170. These lockout registers 170 contain the eight possible data locations in the D-Cache 100 where synonyms may reside by storing the virtual address for previous write misses to the D-Cache 100 that have not completed synonym checking. If the virtual address of the request does not match the virtual address bits stored within lockout registers 170, no possible synonym exists and the read or write is allowed to continue. If, however, the virtual address of the data to be read or written matches an entry in lockout registers 170, then the read or write is treated as a miss and sent to B-Cache 130 to obtain the latest data. A comparator in the lockout registers 170 compares bits <8:4> of the virtual address request with the saved untranslated bits <8:4> of the previous write.

In another embodiment, write misses to data in the same block in the D-Cache 100 may be stored under the same entry in lockout registers 170. In other words, subsequent write misses to the same data block in the D-Cache 100 are merged into the existing entries in lockout registers 170. The lockout registers 170 eliminate stalling a D-Cache 100 read or write until the backmap 150 determines that no synonyms exist.

In one embodiment a completed lockout check bit is added along with the address of the last write miss. When subsequent write misses occur, and they are to the same block as the last write miss the completed lockout check bit is examined. If the bit is set, then a write miss lockout is not necessary for this write miss. The completed lockout check bit is set when synonym checking for the last write miss is completed, and is cleared when a read miss occurs to one of the protected locations or a subsequent write miss occurs.

SEMI-VIRTUAL CACHE

In one embodiment of the invention, the D-Cache 100 is indexed using the virtual addresses but contains physical address tags. These physical address tags for the D-Cache 100 entries are compared in a conventional manner with physical addresses from the translation buffer 120. If the physical address does not match the physical address tag, the reference to the D-Cache 100 is a miss. If they do match, the D-Cache 100 reference is a hit. The use of physical address tags allows current data to remain in the D-Cache 100 during a context switch.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A cache memory system in a data processor including a main memory and a processing unit, said cache memory system comprising:
   a virtually addressed storage cache connected to said main memory for storing in storage cache locations preselected portions of data from main memory, each said cache location including a valid indicator to indicate the data in said cache location is current;
   a translation buffer coupled to said storage cache, for translating a virtual address to a physical address;
   a backmap coupled to said storage cache and said translation buffer, for invalidating data in said storage cache by generating an invalidate index to the cache location at which a valid indicator is to be cleared only when data in the storage cache is to be invalidated; and
   further comprising at least one lockout register for storing addresses for data which may exist in more than one storage cache location, wherein said backmap invalidates all copies of the data in said storage cache after every reference to data in said storage cache using an address in a lockout register.

2. The apparatus of claim 1, wherein said lockout register includes means for comparing read and write requests with said stored addresses.

3. The apparatus of claim 1, wherein said lockout register includes means for merging subsequent requests to a same data block as a first request.

4. The apparatus of claim 1, wherein said lockout register includes a completed lockout check bit for indicating when synonym checking for a miss is completed, and means for locking and unlocking said lockout register in dependence on said completed lockout check bit.

* * * * *